US 12,141,959 B2

(12) United States Patent
Hyatt et al.

(10) Patent No.: US 12,141,959 B2
(45) Date of Patent: Nov. 12, 2024

(54) STREAMLINING AN AUTOMATIC VISUAL INSPECTION PROCESS

(71) Applicant: Siemens Aktiengesellschaft, Munich (DE)

(72) Inventors: Yonatan Hyatt, Tel-Aviv (IL); Alexander Spivak, Hadera (IL); Katherina Shefer, Tel-Aviv (IL)

(73) Assignee: SIEMENS AKTIENGESELLSCHAFT, Munich (DE)

(*) Notice: Subject to any disclaimer, the term of this patent is extended or adjusted under 35 U.S.C. 154(b) by 378 days.

(21) Appl. No.: 17/275,224

(22) PCT Filed: Sep. 13, 2019

(86) PCT No.: PCT/IL2019/051027
§ 371 (c)(1),
(2) Date: Mar. 11, 2021

(87) PCT Pub. No.: WO2020/053866
PCT Pub. Date: Mar. 19, 2020

(65) Prior Publication Data
US 2022/0044379 A1 Feb. 10, 2022

Related U.S. Application Data

(60) Provisional application No. 62/730,545, filed on Sep. 13, 2018.

(30) Foreign Application Priority Data

Sep. 13, 2018 (IL) .......................................... 261733

(51) Int. Cl.
*G06T 7/00* (2017.01)
*G06F 18/40* (2023.01)
(Continued)

(52) U.S. Cl.
CPC .............. *G06T 7/001* (2013.01); *G06F 18/40* (2023.01); *G06V 10/235* (2022.01); *G06V 10/46* (2022.01); *G06V 10/945* (2022.01)

(58) Field of Classification Search
CPC ........... G06T 7/001; G06T 2207/20092; G06F 18/40; G06V 10/235; G06V 10/46; G06V 10/945; G05B 1/00; G05B 6/05
See application file for complete search history.

(56) References Cited

U.S. PATENT DOCUMENTS

| 6,999,614 | B1* | 2/2006 | Bakker | G06T 7/0004 |
| | | | | 382/145 |
| 7,206,443 | B1 | 4/2007 | Orbotec | |

(Continued)

FOREIGN PATENT DOCUMENTS

| IL | 259143 | A | * | 6/2018 |
| IL | 261733 | A | * | 10/2018 |

(Continued)

OTHER PUBLICATIONS

Machine Learning-Based Imaging System for Surface Defect Inspection International Journal of Precision Engineering and Manufacturing—Green Technology. vol. 3 No. 3, pp. 303-310 Park et al. Jul. 10, 2016.

*Primary Examiner* — Samir A Ahmed
(74) *Attorney, Agent, or Firm* — Cozen O'Connor

(57) ABSTRACT

Embodiments of the invention provide automatic detection of same-type objects on an inspection line and automatically capture and/or display an image of the object once it is detected. Additionally, embodiments of the invention automatically provide the outline of an object to a user, enabling the user to either confirm or easily correct the outline. The confirmed or corrected outline is then automatically applied to all images of inspected items of the same-type, allowing (Continued)

optimization of inspection tasks such as defect detection, for all inspected items, based on a short, possibly a one-time, input, from the user.

7 Claims, 8 Drawing Sheets

(51) Int. Cl.
  *G06V 10/22* (2022.01)
  *G06V 10/46* (2022.01)
  *G06V 10/94* (2022.01)

(56) References Cited

U.S. PATENT DOCUMENTS

| | | | |
|---|---|---|---|
| 9,224,070 | B1 | 12/2015 | Sundareswara et al. |
| 2003/0182251 | A1 | 9/2003 | Kim et al. |
| 2008/0101682 | A1 | 5/2008 | Blanford et al. |
| 2010/0215246 | A1 | 8/2010 | Albeck et al. |
| 2012/0128230 | A1 | 5/2012 | Meada |
| 2012/0154607 | A1 | 6/2012 | Moed et al. |
| 2012/0155741 | A1 | 6/2012 | Shibuya |
| 2013/0135490 | A1 | 5/2013 | Sagisaka et al. |
| 2015/0022634 | A1 | 1/2015 | Perez |
| 2015/0064813 | A1* | 3/2015 | Ayotte ............ G06T 7/001 438/16 |
| 2015/0131116 | A1 | 5/2015 | Sochi |
| 2015/0355104 | A1* | 12/2015 | Matsuda ......... G06T 7/586 356/237.2 |
| 2019/0156472 | A1* | 5/2019 | Link ............... G06T 7/344 |
| 2019/0346375 | A1* | 11/2019 | Anantha ........ G01N 21/9501 |

FOREIGN PATENT DOCUMENTS

| | | | |
|---|---|---|---|
| KR | 101688458 | | 12/2016 |
| WO | WO 2019/130307 | * | 7/2019 |
| WO | WO 2019/215746 | * | 11/2019 |

* cited by examiner

STREAMLINING AN AUTOMATIC VISUAL INSPECTION PROCESS

CROSS-REFERENCE TO RELATED APPLICATIONS his is a U.S. national stage of application No. PCT/IL2019/051027 filed 13 Sep. 2019. Priority is claimed on Provisional Application No. 62/730,545 filed 13 Sep. 2018, the content of which is incorporated herein by reference in its entirety.

FIELD

The present invention relates to automated visual inspection processes, for example, inspection of items during a production process.

BACKGROUND

Inspection during production processes can be instrumental in ensuring the quality of the production. For example, inspection during production processes at manufacturing plants helps control the quality of products by identifying defects and then acting upon this identification, for example, by fixing the defect or discarding the defective part. During production, the process of defect detection is essential for quality assurance (QA), gating and sorting on production lines, and is consequently useful in improving productivity, improving production processes and working procedures, reducing defect rates, and reducing re-work and waste.

Visual inspection methods are used in production lines to identify visually detectable anomalies that may have a functional or esthetical impact on the integrity of a manufactured item. Existing visual inspection solutions for production lines rely on custom made automated visual inspection systems, which are typically highly expensive and require expert integration of hardware and software components, as well as expert involvement in setting the surroundings, the camera-system apparatus, imaging parameters and software and algorithms.

Typically, in processes based on visual machine learning techniques, dozens or hundreds of images must be acquired and then carefully selected to represent all possible variations of an imaged item. Areas of interest on the item must be manually marked in a slow and cumbersome set up process.

Even after a system is set up and running, it is typically constrained to a specific item and the specific imaging environment for which the solution was set-up. Additionally, since existing systems are constrained to a specific item, any change in the item or in the position of the item on the inspection line or the surrounding illumination, requires manual adjustment of the system.

Industrial plants' need for agility and usability is currently left unanswered by the cumbersome and expert based contemporary inspection solutions.

SUMMARY

Embodiments of the invention provide automatic and easy set up of a visual inspection process, enhancing implementation of the visual inspection solution for any type of inspected object.

Embodiments of the invention provide automatic detection of same-type objects on an inspection line and automatically capture and/or display an image of the object once it is detected. Additionally, embodiments of the invention automatically provide the outline of an object to a user (e.g., an operator of the inspection line), enabling the user to either confirm or easily correct the outline. The confirmed or corrected outline is then automatically applied to all images of inspected items of the same-type, allowing optimization of inspection tasks such as defect detection, counting, sorting and the like, for all inspected items, based on a short interaction, possibly a one-time input, from the user.

Embodiments of the invention further enable collecting a large number of reference images in a set up process, with minimal user involvement, thereby greatly enhancing automation of the inspection process.

Enabling the user short and effective interactions with the system while setting up, greatly stream-lines the inspection process and provides a user friendly and efficient solution to visual inspection.

In one aspect the invention provides a visual inspection system and method which include using a camera to obtain an image of an object on an inspection line, a user interface device having a display and a processor to receive the image of the object, detect the object from the image and create an outline tightly surrounding the detected object. The processor may cause the object and the outline to be displayed via the user interface.

In another aspect, the invention provides a method and system for automatic visual inspection, which includes using a processor to display a first image of an item on an inspection line and of the item's outline, receive confirmation of the item and of the item's outline, detect a same-type item on the inspection line in a second image and display the second image with the item's outline surrounding the same-type item in the second image.

In yet another aspect the invention provides a method and system for automatic visual inspection, which includes using a processor to create a bounding shape around an object in an image of an inspection line, display the bounding shape around the object to a user, accept input from the user, create an adjusted bounding shape based on the input from the user, and control a device based on the adjusted bounding shape.

In yet another aspect, the invention provides a visual inspection set up process and system which include using a processor to display an image of an object on an inspection line, receive confirmation that the object is a defect-free object, acquire a plurality of additional images of same-type objects on the inspection line and after a desired amount of additional images are acquired, display images of same-type objects that differ from the defect-free object.

In a further aspect, the invention provides a method and system for automatic visual inspection, which includes using a processor to receive user input regarding defects on an item in a first image of an inspection line, create a mark of a region of interest based on the user input, detect a same-type item on the inspection line in a second image, apply the mark to the same-type item in the second image and control a device based on the mark applied to the same-type item in the second image.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1:
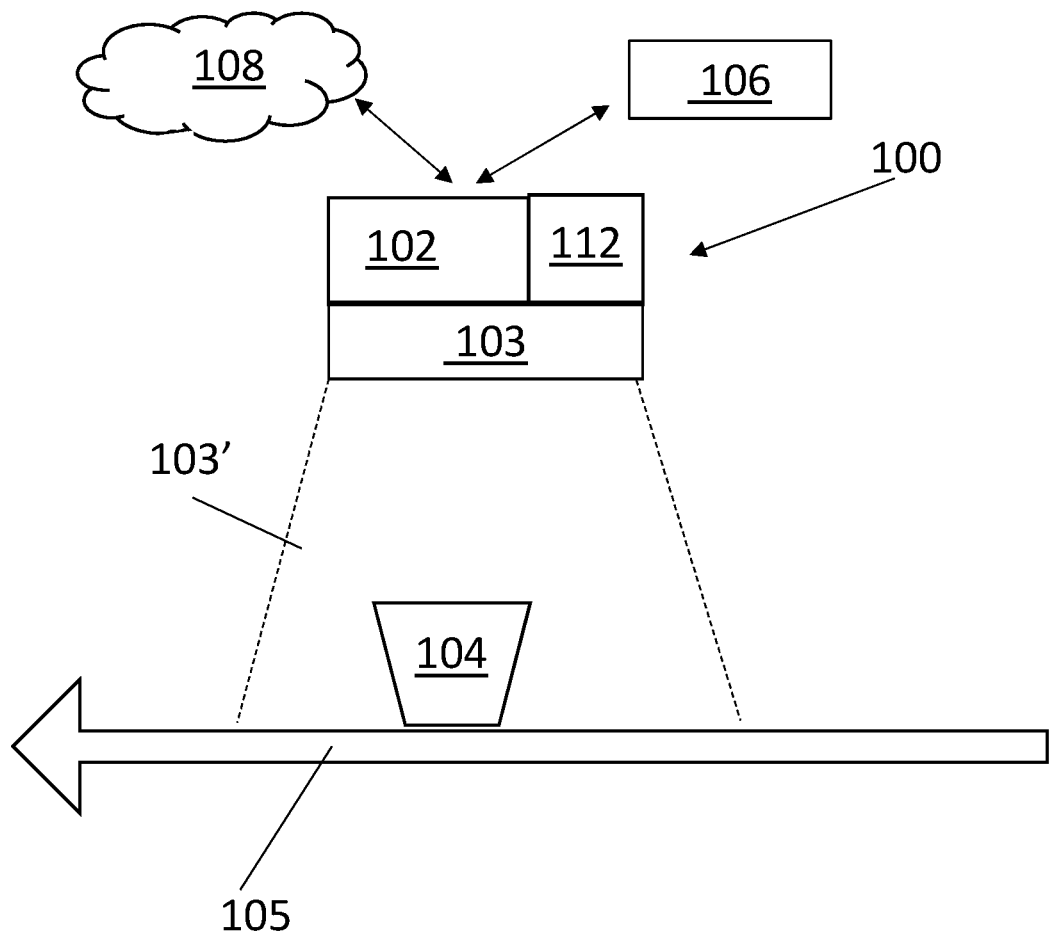
FIG. 1 schematically illustrates a system for automatic visual inspection operable according to embodiments of the invention.

Embodiments of the invention provide automatic tools to enable a user of an inspection line process to quickly and easily implement a process for detecting visible defects or other inspection task, such as QA, counting, sorting, and gating, etc. on any type of inspected item or object.

The terms "item" and "object" are used interchangeably and are meant to describe the same thing.

An inspection line process may include a set up stage prior to an inspection stage. In one embodiment, in the set up stage, samples of a manufactured item with no defects (defect-free items) are imaged on an inspection line. The images (which may also be referred to as set up images and/or reference images) are analyzed by a processor and are then used as reference images for inspection algorithms, e.g., image processing algorithms run at the inspection stage.

In the inspection stage, inspected items (manufactured items that are to be inspected, e.g., for defects, for sorting and/or for counting) are imaged and defect detection, sorting and/or counting is performed on the inspected item based on analysis of the images.

In the set up stage, a processor learns spatial properties and uniquely representing features or attributes of a defect-free item in images, as well as optimal parameters of images of defect-free items, for example, optimal imaging parameters (e.g., exposure time, focus and illumination). These properties may be learned, for example, by analyzing images of a defect-free item using different imaging parameters and by analyzing the relation between different images of a same type of defect-free item. This analysis during the set up stage enables to discriminatively detect a same type of item (either defect free or with a defect) in a new image, regardless of the imaging environment of the new image.

In one embodiment the analysis of the set up images is used to determine a spatial range in which the defect free item shows no perspective distortion. The level of perspective distortion between items in different images can be analyzed, for example, by detecting regions in an item which do not have corresponding features between the set up images, by analyzing the intersection location and angles between the item's borders or the item's marked areas of interest, etc. The borders of the spatial range may be calculated by comparing two (or more) set up images (in which items may be positioned and/or oriented differently) and determining which of the images show perspective distortion and which do not.

The calculated range can then be used to determine the borders of where and/or in which orientation, scale or other disposition, an inspected item may be placed on the inspection line so as to avoid distortion. Additionally, by using a set of set up images as references for each other, the processor can detect images having similar spatial decomposition and this set of images can then be analyzed to see if there are enough similar set up images to allow registration, defect-detection and other analyses for each possible location on the inspection line.

"Enough set up images" are collected when an essentially complete representation of a type of item is achieved. For example, when enough images are collected to enable determining the spatial range in which each reference image can be used as a distortion-less reference, as described above. Analysis of the set up images may be performed to collect information regarding possible 2D shapes and 3D characteristics (e.g., rotations on the inspection line) of an item or to find uniquely discriminative features of the item and the spatial relation between these unique features, as preserved between the set up images.

Based on the information collected from set up images a processor can detect a second item of the same type and perform inspection tasks, even if the second item was not previously learned by the processor. This allows the processor to detect when a new item (of the same type) is imaged, and then to analyze the new item, for example, to determine if it is in an allowed location and search for a defect on an inspected item, based on the analysis of set up images.

The term "same-type items" or "same-type objects" refers to items or objects which are of the same physical makeup and are similar to each other in shape and dimensions and possibly color and other physical features. Typically, items of a single production series, batch of same-type items or batch of items in the same stage in their production line, may be "same-type items". For example, if the inspected items are sanitary products, different sink bowls of the same batch are same-type items.

A defect may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, and an incorrect alignment of the item or parts of the item, a wrong or defected barcode, and in general, any difference between the defect-free sample and the inspected item, which would be evident from the images to a user, namely, a human inspector. In some embodiments a defect may include flaws which are visible only in enlarged or high resolution images, e.g., images obtained by microscopes or other specialized cameras.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "creating", "producing", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

A system for automatic visual inspection, according to one embodiment of the invention, is schematically illustrated in FIG. 1.

Exemplary system 100, which may be used for automated visual inspection of an item on an inspection line, includes a processor 102 in communication with one or more camera(s) 103 and with a device, such as a user interface device 106 and/or other devices, such as storage device 108.

Components of system 100 may be in wired or wireless communication and may include suitable ports and/or network hubs. In some embodiments processor 102 may communicate with a device, such as storage device 108 and/or user interface device 106 via a controller, such as a programmable logic controller (PLC), typically used in manufacturing processes, e.g., for data handling, storage, processing power, and communication capabilities. A controller may be in communication with processor 102, storage device 108, user interface device 106 and/or other components of the system 100, via USB, Ethernet, appropriate cabling, etc.

Processor 102 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 102 may be locally embedded or remote.

The user interface device 106 may include a display, such as a monitor or screen, for displaying images, instructions and/or notifications to a user (e.g., via text or other content displayed on the monitor). User interface device 106 may also be designed to receive input from a user. For example, user interface device 106 may include a monitor and keyboard and/or mouse and/or touch screen, to enable a user to input feedback.

Storage device 108 may be a server including for example, volatile and/or non-volatile storage media, such as a hard disk drive (HDD) or solid-state drive (SSD). Storage device 108 may be connected locally or remotely, e.g., in the cloud.

Camera(s) 103, which are configured to obtain an image of an inspection line, are typically placed or positioned in relation to an inspection line 105 (e.g., a conveyer belt), such that items 104 placed on the inspection line 105 are within the FOV 103' of the camera 103. Dependent on the frame capture rate of camera 103 and speed of the inspection line 105 and possibly other parameters, each item 104 may stay within FOV 103' for several seconds and several images of the same item 104 may be obtained.

Camera 103 may include a CCD or CMOS or other appropriate chip. The camera 103 may be a 2D or 3D camera. In some embodiments the camera 103 may include a standard camera provided, for example, with mobile devices such as smart-phones or tablets. In other embodiments the camera 103 is a specialized camera, e.g., a camera for obtaining high resolution images.

Processor 102 receives image data (which may include data such as pixel values that represent the intensity of reflected light as well as partial or full images or videos) of objects on the inspection line 105 from the one or more camera(s) 103 and runs processes according to embodiments of the invention.

Processor 102 is typically in communication with a memory unit 112. Memory unit 112 may store at least part of the image data received from camera(s) 103.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 112 stores executable instructions that, when executed by processor 102, facilitate performance of operations of processor 102, as described herein.

In one embodiment processor 102 applies image processing techniques (e.g., as described above) to automatically detect same-type objects in images of an inspection line. Once a same-type object is detected, processor 102 may automatically capture, store and display an image of the detected object, rather than have the user confirm the object manually before capturing and storing its image, as done in prior art systems.

In one embodiment processor 102 receives an image of an object (e.g., object 104), typically a defect-free object, and detects the object in the image (e.g., using object detection algorithms, e.g., as described herein). The processor 102 may create an outline tightly surrounding the detected object (namely, the outline is typically close to the boarders of the object) and may then cause the object and the outline to be displayed, e.g., via user interface (106).

In some embodiments a user can insert input, such as instructions or information via user interface device 106 and processor 102 creates the outline around the detected object based on input from the user. For example, the input from the user may include an outline generally surrounding the object and based on the general outline, processor 102 creates an outline tightly surrounding the object.

In some embodiments the image of the object may be stored (e.g., in a database on storage device 108) based on input from a user via the user interface device 106. For example, an image of the object 104 may be displayed to a user, e.g., via user interface device 106, and only if a user confirms (e.g., that the object is of a desired type or that the object is defect-free, etc.), that image is stored and can be used in later processes, as described herein.

In one embodiment, processor 102 may initially detect an object 104 in an image of the inspection line 105 (e.g., using object detection algorithms, e.g., as described herein), create a bounding shape around the object and display the bounding shape around the object to a user, for example, on user interface device 106, for user confirmation or correction. In some embodiments processor 102 may accept input from the user, e.g., confirmation and/or correction of the bounding shape, via user interface device 106.

In some embodiments, processor 102 may create an adjusted bounding shape according to the input from the user. Processor 102 may then control a device based on the adjusted bounding shape.

In some embodiments processor 102 may control another processor. For example, processor 102 may cause the adjusted bounding shape to be applied to a same-type object in a previously or subsequently obtained image of the inspection line. A display, such as the display of user interface device 106, may then be controlled to display the previously or subsequently obtained image of the inspection line, with the adjusted bounding shape around a same-type object.

A bounding shape and/or adjusted bounding shape may be a shape, such as a polygon or circular shape, enclosing an imaged object close to the boarders of the object.

Figure 2A:
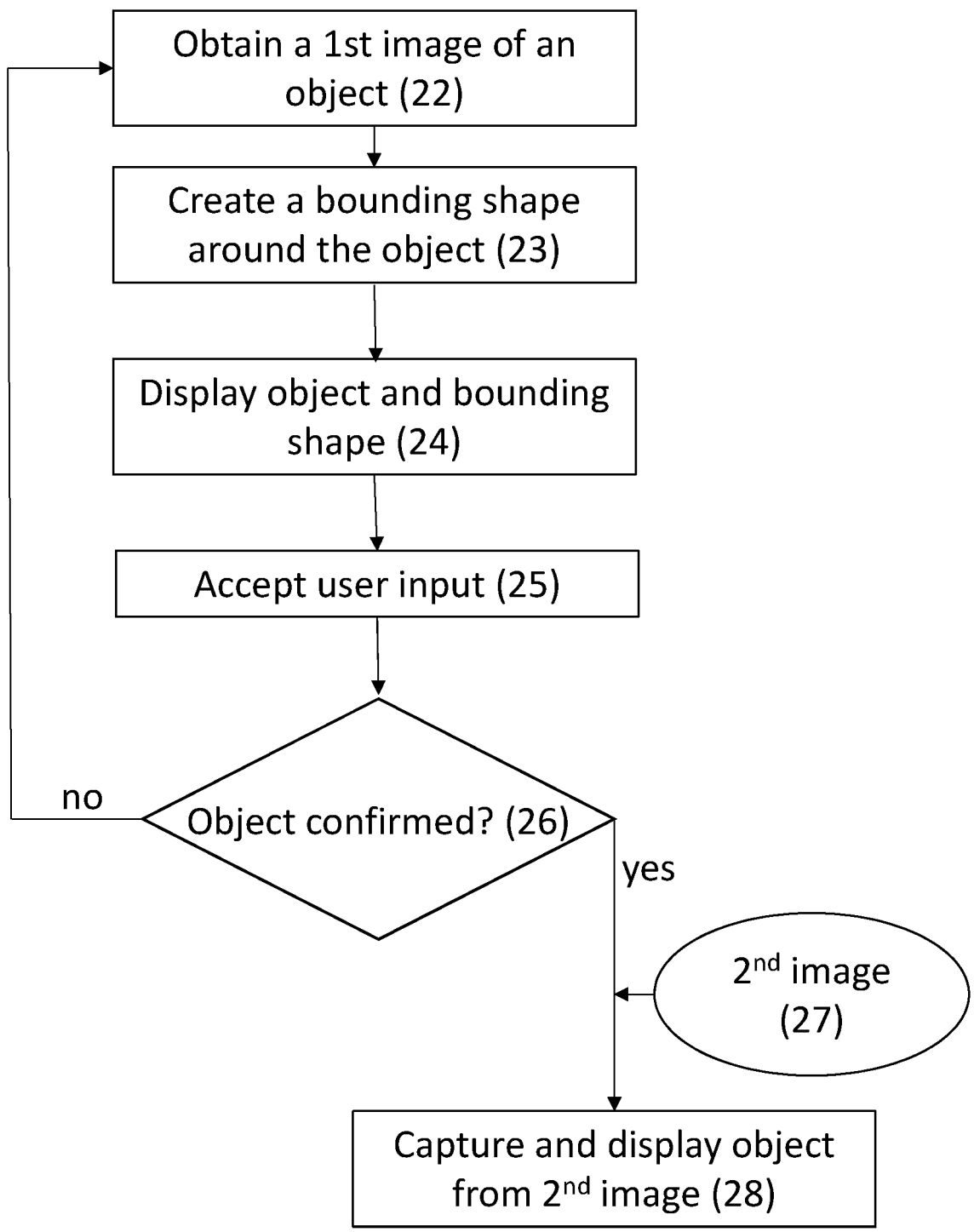
FIGS. 2A and 2B schematically illustrate a set up stage of an automatic visual inspection process, according to embodiments of the invention.

FIG. 2A schematically illustrates an exemplary process for automatic visual inspection, typically a set-up stage of the visual inspection process, which is intended to gather reference images for the following inspection stage. In one embodiment the process is carried out by processor 102 and includes obtaining an image of an object (22), e.g., a defect-free object, on an inspection line. For example, an image of object 104 on inspection line 105 may be obtained from camera 103.

Processor 102 then creates a bounding shape around the object in the image (23) and displays the bounding shape around the object (24). For example, an image of the object and the bounding shape superimposed on the image of the object may be displayed on a display of user interface device 106.

Processor 102 accepts input from a user (25) (e.g., via user interface device 106) which includes confirmation of the object, e.g., by confirming or adjusting the bounding shape. "Confirmation of an object" may include indications from a user regarding the status of a displayed object. For example, confirmation may include an indication that the displayed object is indeed the type of object that the user wishes to inspect. Alternatively or in addition, confirmation may include indication that the displayed object is defect-free or defected.

Once an object is confirmed (26), the shape and/or features of the confirmed object may be used to automatically detect same-type objects in subsequently obtained images. Thus, processor 102 may automatically detect same-type objects in subsequent images (27) and may automatically capture and display and possibly store for later use, the image of a detected same-type object (28), rather than wait for manual input and/or confirmation of same-type objects.

In one embodiment, the set up stage may be further streamlined and facilitated by obtaining confirmation from a user once (or a small number of times) and gathering many reference images based on the one (or few) confirmations.

Figure 2B:
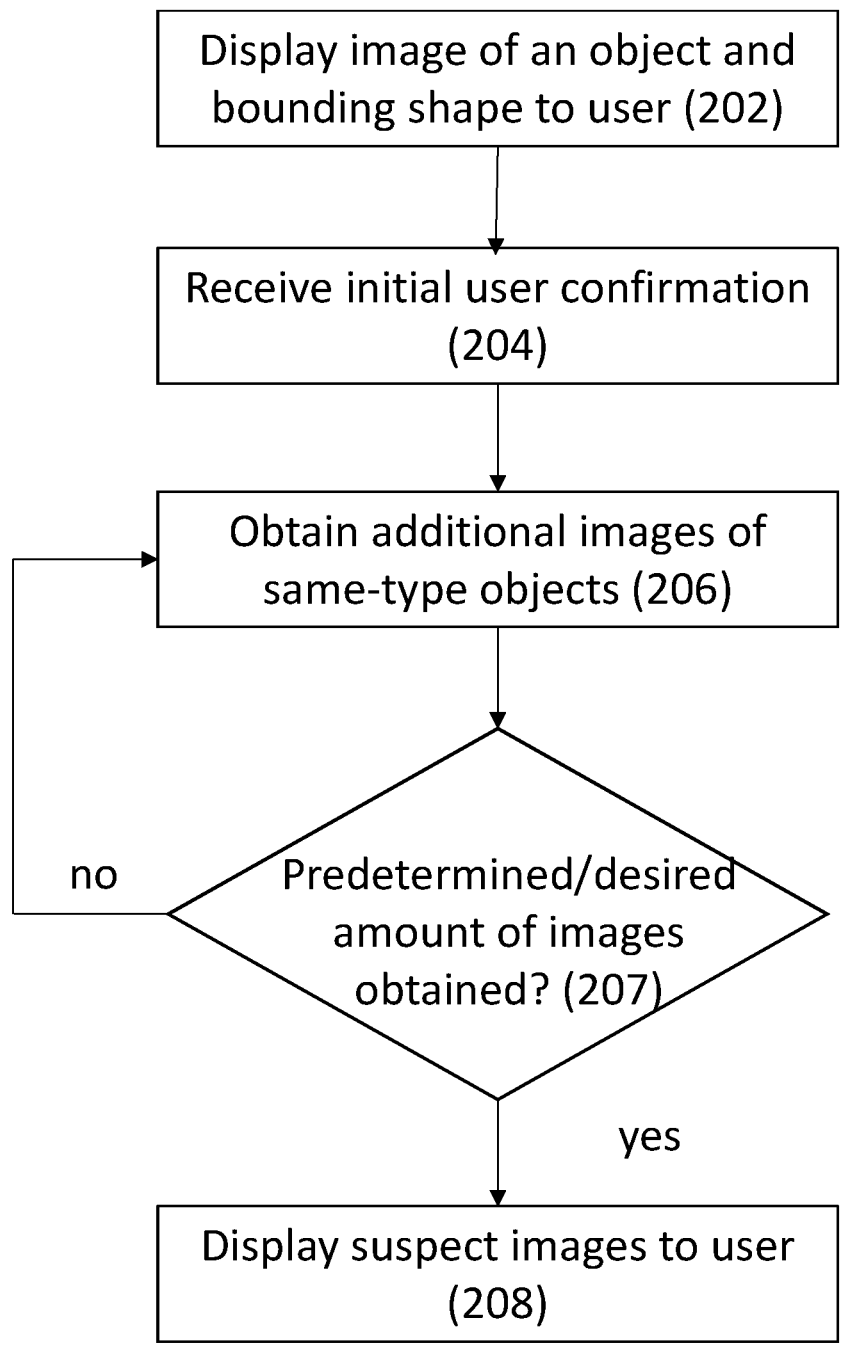

In this embodiment, an example of which is schematically illustrated in FIG. 2B, an image of an item surrounded by a bounding shape is displayed to a user (202) and initial user confirmation is received (204), to indicate that the displayed image is a user confirmed image. User confirmation may include confirmation that the displayed bound item is accurately bound and/or that it is a confirmed defect-free item and/or that the item is correctly positioned and/or confirmation of other aspects of the item within the image. User confirmed images may be stored, for example, in a reference image database.

Additional images of same-type objects are then acquired (206), for example, enough images are acquired to obtain a full representation of an item (as described above). Once a predetermined or desired amount of additional images are acquired (207) or once a predetermined time has passed, images of suspected items (e.g., images of items determined to differ from the defect-free items in the reference image database) are displayed to the user (208) to obtain user confirmation or correction.

Suspected items may have suspected defects or may be in a wrong position or location or may not be very well detected or not accurately bound by the bounding shape, etc. Same-type objects may have permitted differences, which are not defects. For example, objects may have texture, pattern or color differences on the object surface, which are not considered to be defects by a user. Also, same-type objects may have permitted shape tolerances. For example, an object may be imaged from different angles and/or at different locations on the inspection line without showing perspective distortion and may thus be within the permitted shape tolerance. Due to these and other permitted differences objects may be determined to be defected or with suspected defects, even though they are not considered defective by the user.

User input may indicate if a suspected item is indeed not a good reference image (e.g., if the item includes a defect or not, if the item bounding is correct, if the item is correctly positioned or not, etc.). In some embodiments, if the user input indicates that suspected defects are indeed defects or indicates defects undetected by processor 102, this defect may be retroactively detected in previously obtained and stored reference images and these images, in which the defect appears, may be retroactively taken out of the reference image database. Similarly, other user indications or confirmations (e.g., relating to location of the item, bounding shape of the item, etc.) may be used to update the reference image database, also retroactively, if necessary Retroactively updating the reference image database can help avoid requesting manual confirmation from the user in past and future images and enables performing inspection tasks based on a single user input, thereby saving time for the user and facilitating the inspection process.

Automatically displaying a bounding shape around a displayed object and requesting initial user confirmation at an early, short, stage, enables collecting many additional images of same-type objects even with suspected defects or other differences from reference images. Instead of requesting the user's confirmation for each suspected item, the user's confirmation can be requested only once (or a small amount of times), e.g., after enough reference images have been collected to enable moving on to the inspection stage. This way, the user is saved from spending a mass of time in confirming and adjusting the reference images while they are being collected, but can do so in a single instance after an amount of reference images have been collected. Thus, embodiments of the invention enable minimizing the amount of time required from the user to review images.

In some embodiments, user confirmation (e.g., of a suspected item being a good reference image or not) can be input via a button or other mechanism employed by user interface device 106. A user may press the button or otherwise indicate confirmation of an image displayed via user interface 106, however, this might not be the optimal image to use as a reference image. As described above, several images of the same suspected item may be captured, thus, several images of a suspected item may be displayed for user confirmation. Some of the images may be images of the object while it is still moving (e.g., due to movement of the inspection line 105) or may be otherwise less than optimal for defect detection and other inspection tasks. In some embodiments a user may confirm one of the several images which is not necessarily the optimal image of the suspected object. In this case processor 102 may receive user confirmation and then identify an optimal image of the object for which the user confirmation was received. Once the optimal image (e.g., an image which includes minimal motion, an image most clearly showing the object, or otherwise optimal for inspection tasks) was identified processor 102 will use the optimal image as the user confirmed image, namely, an image with which to update the reference database. Thus, in some embodiments a user confirmed image which is used to update the reference image database, is not necessarily the same image for which user confirmation was received. This embodiment enables the user to easily confirm or otherwise indicate an object, e.g., by clicking on a display on which an image of the object is displayed, even in fast moving environments (e.g., when images are displayed very quickly) or in very slow moving processes, since the user does not have to wait for any specific image to be displayed. Rather, the user may confirm or indicate on any one of the images of the object and the system will automatically choose an optimal image of that object, thereby greatly streamlining the inspection process.

In some embodiments, once user confirmation is received the system may switch temporarily to inspection mode in order to simulate parameters of inspection (e.g., camera and/or illumination parameters). Namely, processor 102 may apply inspection algorithms on images of the object in response to receiving user confirmation. The optimal image may then be identified while using parameters of inspection, which will ensure that the optimal image which will be used to update the reference database, will be similar to images that will be obtained during the inspection stage, thereby providing a more accurate and efficient visual inspection process.

Figure 2C:
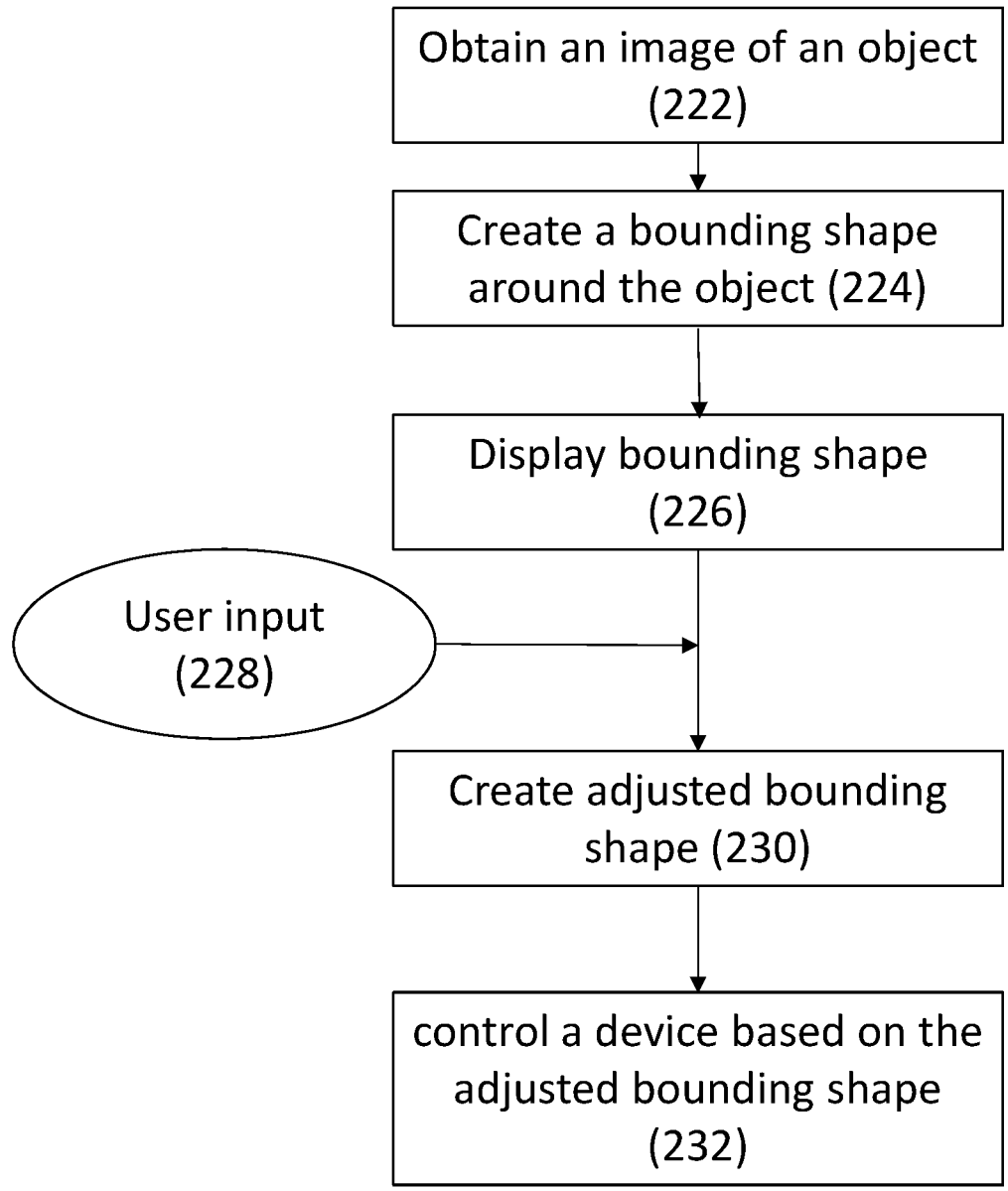
FIG. 2C schematically illustrates a method for automatic visual inspection according to embodiments of the invention.

In another embodiment, which is schematically illustrated in FIG. 2C, a method for automatic visual inspection, which is carried out, for example by processor 102, includes obtaining an image of an object (222) on an inspection line. For example, an image of object 104 on inspection line 105 may be obtained from camera 103.

Processor 102 then creates a bounding shape around the object in the image (224) and displays the bounding shape around the object (226). For example, an image of the object and the bounding shape superimposed on the image of the object may be displayed on user interface device 106.

Processor 102 accepts input from a user (228) (e.g., via user interface device 106) and creates an adjusted bounding shape according to the input from the user (230). Processor 102 may then control a device based on the adjusted bounding shape (232).

In some embodiments the bounding shape is automatically created around an object detected in an image. Image analysis using computer vision techniques may be used to detect the object in the image obtained in step (222) and the bounding shape may be automatically created in step (224) around the detected object. For example, a pixel-intensity threshold method may be used to initially detect the object, in which pixels higher than the threshold are considered to belong to the object. Once an initial object is detected a bounding shape is created around it and is displayed to a user for confirmation or correction.

In additional images a same-type object is detected, for example, as described above, using spatial properties and uniquely representing features or attributes learned from the initial defect-free object using different imaging parameters and by analyzing the relation between different images of a same-type of defect-free item. As discussed above, this analysis enables to discriminatively detect a same-type of item (either defect-free or with a defect) in an image, regardless of the imaging environment of the image. Once a same-type item is detected, a bounding shape may be created around the same-type object. Since objects are automatically detected and bounding shapes can be automatically created around detected objects, processor 102 may also automatically zoom-in on the bounding shape or on specific parts of the bounding shape so as to assist a user in adjusting the bounding shape. For example, processor 102 may cause displaying an enlarged image of a portion of the object and/or of the bounding shape surrounding it, may receive input from a user regarding the bounding shape and may then create an adjusted bounding shape according to the input from the user.

In other embodiments an initial bounding shape is input or indicated by a user and both a user indication and automatic algorithms may be used to create the bounding shape. For example, pixel level segmentation may be used, or automatic segmentation may be used to split the image to different segments and allow the user to choose the segments representing the object. In some embodiments, a user may mark a bounding shape (e.g., on a display) and an automatic algorithm then creates a polygon (or other appropriate shape) tightened to the object border closest to the bounding shape input by the user. In other examples the automatic algorithm may create a polygon (or other appropriate shape) from a user chosen segment.

A bounding shape may be displayed on a display (e.g., a display of user interface device 106) as a line, e.g., a colored line, a broken line or other style of line, surrounding the object or as any other indication typically visible to a user.

In some cases, objects may be placed on an inspection line at different positions, either by design or due to human error or the like, such that a same-type object in one image may be positioned on the inspection line at an angle relative to a position of the object in another image. It should be appreciated that "angle" may relate to different locations and positions in space, e.g., pitch roll and yaw, of the object on the inspection line.

An adjusted bounding shape may be created based on the angle. For example, a first bounding shape may be displayed surrounding a first object in a first image. If a second object, in a second image, is determined to be at an angle to the first object then the position of the second object may be corrected in the second image. For example, the second object may be rotated in an opposite direction by the same angle such that it is displayed in the second image at the same position of the first object in the first image. A second bounding shape (which may be an adjusted bounding shape) is created around the second object and may be rotated by the angle such that it too is displayed in the second image at a similar position to the position of the bounding shape displayed in the first image.

In other embodiments the second object and second bounding shape may be displayed in the second image at an angle relative to the first object and its bounding shape as displayed in the first image.

In some embodiments, after input from the user is accepted (step 228) a new image is obtained and a new same-type object is detected in the new image. An adjusted bounding shape (e.g., based on input from the user) may be created around the same-type object in the new image (step 230) and a device may be controlled based on the adjusted bounding shape (step 232).

Devices controlled based on the adjusted bounding shape may include modules associated with processor 102 or other devices in communication with processor 102, for example, as detailed below, with reference to FIG. 3.

Figure 3:
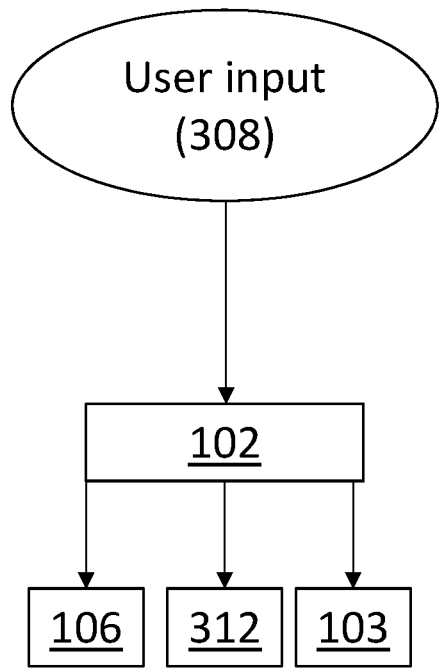
FIG. 3 schematically illustrates a processing unit controlling a device according to embodiments of the invention.

In the example, which is schematically illustrated in FIG. 3, after a first image of an object is displayed with a bounding shape surrounding the object, processor 102 receives user input 308.

The input from the user may include, for example, confirmation of the bounding shape which is displayed around the object in the first image. In this case, the adjusted bounding shape is the same bounding shape created around the object in the first image.

In other embodiments the input from the user may include changes or adjustments to the bounding shape displayed in the first image and the adjusted bounding shape is a bounding shape changed according to the input from the user. As discussed above, processor 102 may zoom-in around the detected object, e.g., around the borders of the object, to provide the user with clearer visibility of the object borders. A user can then adjust the bounding shape around the object's borders if needed, without having to manually perform the zoom-in operation.

Confirmation or changes to the bounding shape, which are input by the user, may also provide confirmation of the object. Namely, the user confirms that the displayed object is the desired type of object. Once an object is confirmed, same-type objects can be automatically detected in subsequently obtained images and processor 102 may control camera 103 and user interface device 106 to capture, store and display images only when same-type objects are detected.

In some embodiments after a first image of an object is displayed with a bounding shape surrounding the object, processor 102 receives user input and creates an adjusted bounding shape based on user input.

Processor 102 may apply the adjusted bounding shape to a same-type object in a second image. The second image may be an image obtained prior to the first image (namely, the second image may be obtained at an earlier time than the first image) or an image obtained subsequently to the first image (namely, the second image may be obtained at a later time than the first image).

In one embodiment processor 102 may control a user interface device (e.g., user interface device 106) to display the previously or subsequently obtained images, with the adjusted bounding shape around the same-type objects in the images.

Alternatively or in addition, a defect detecting module 312 may be used to detect one or more defect on the object surrounded by the adjusted bounding shape in the image. Defects may be detected within the area surrounded by the adjusted bounding shape going forward, in images subsequently obtained and/or retroactively, in images previously obtained. Thus, processor 102 may control defect detecting module 312.

Alternatively or in addition, processor 102 may control a camera (e.g., camera 103) to optimize imaging parameters (such as exposure time, focus and illumination) relating to the area of the image within the adjusted bounding shape. For example, exposure time, focus, illumination and other imaging parameters may be automatically adjusted to provide an optimal image of the area within the adjusted bounding shape, even at the expense of other areas of the image.

Figure 4:
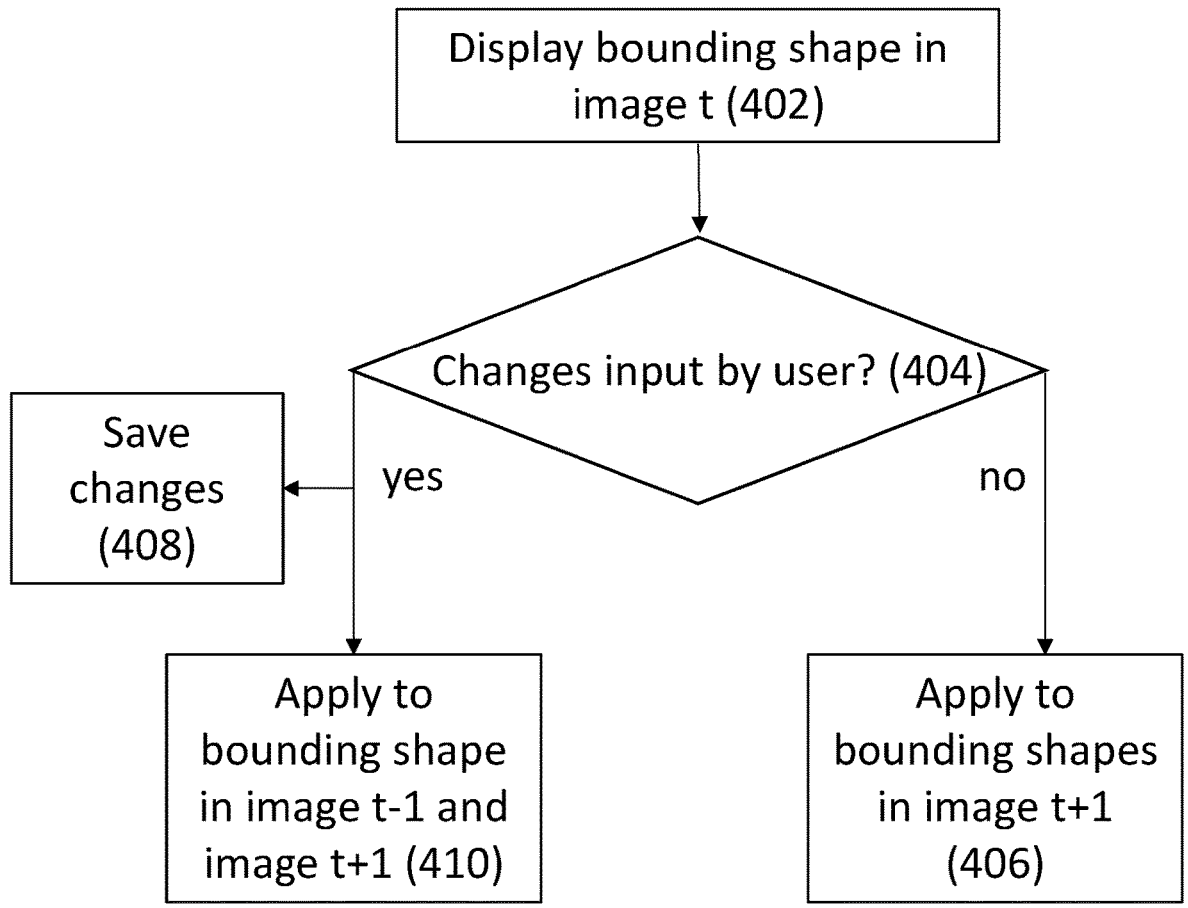
FIG. 4 schematically illustrates a method for automatic visual inspection including displaying a previously or subsequently obtained image with an adjusted bounding shape, according to embodiments of the invention.

In one embodiment, which is schematically illustrated in FIG. 4, the first image is obtained later than the second image, thus, a processor may be used to cause a previously or subsequently obtained image of an object on an inspection line, to be displayed with the adjusted bounding shape around same-type objects.

A method for automatic visual inspection may include using a processor to create a bounding shape around an object in a first image of an inspection line (an image obtained at time=t) and display the bounding shape around the object to a user (402). The processor may accept input from the user. If the user input includes changes to the bounding shape (404) then the changes are saved (408) (for example, in storage device 108) and are applied to bounding shapes in previous images (images obtained at time=t−1 or earlier) and to images obtained later (images obtained at time=t+1 and later) (410). If the user input does not include changes (e.g., the user confirms the displayed bounding shape) (404) then the bounding shape is applied to later obtained images (images obtained at time=t+1 and later) (406).

Thus, if the user input includes changes to the bounding shape (404) an adjusted bounding shape can be created according to the input from the user, a same-type object can then be detected in a second image of the inspection line (e.g., the object may be detected using computer vision techniques as described herein) and the adjusted bounding shape may be applied to the object detected in the second image. The second image may then be displayed with the adjusted bounding shape around the same-type object.

Using the confirmed or adjusted bounding shape retroactively and going forward can help avoid requesting manual confirmation from the user in past and future images and enables performing inspection tasks based on a single user input, thereby saving time for the user and facilitating the inspection process.

Figure 5:
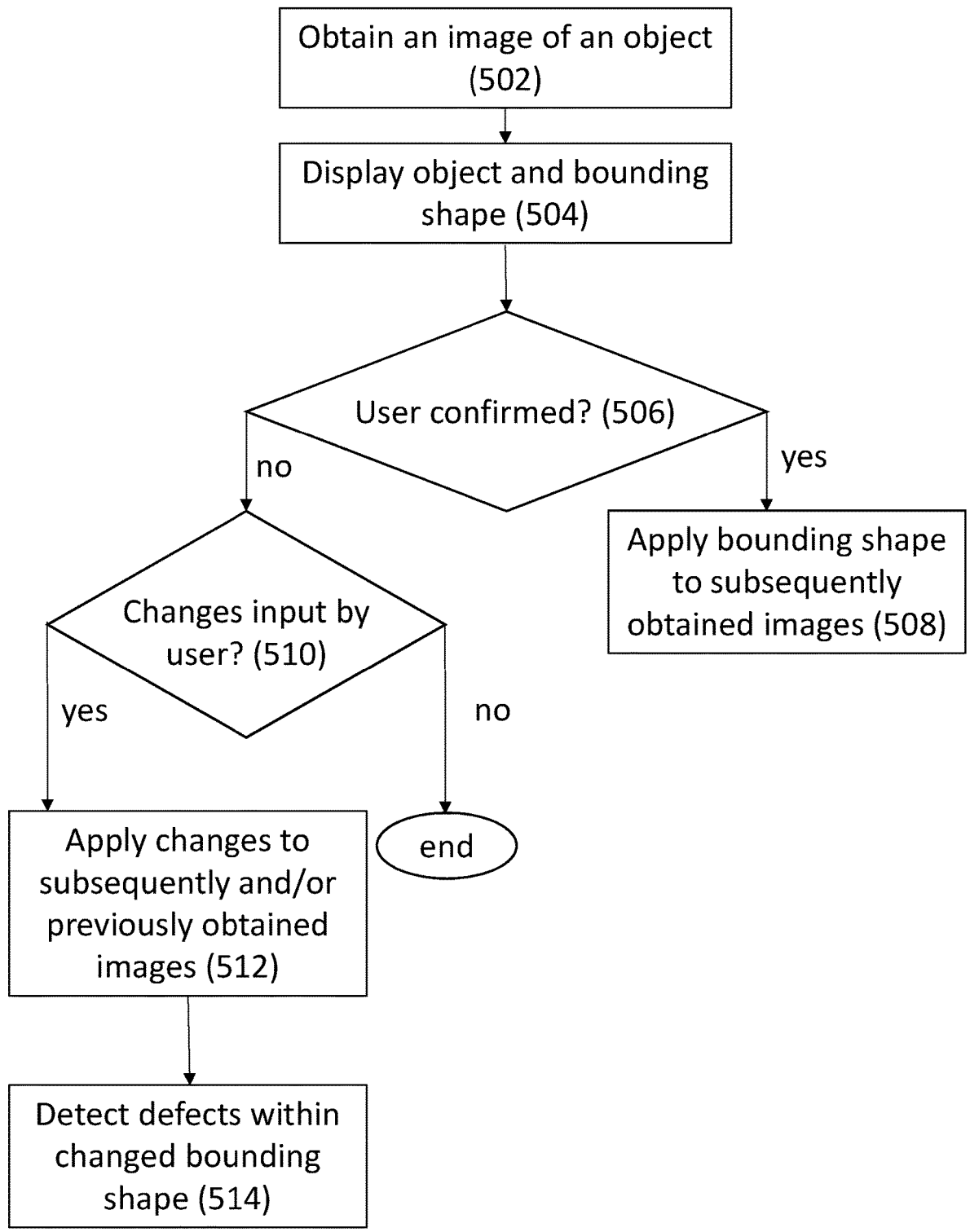
FIG. 5 is a schematic illustration of a method for automatic detection of defects, according to embodiments of the invention.

In one embodiment, which is schematically illustrated in FIG. 5, a method for automatic visual inspection includes obtaining an image of an object (502), e.g., an object on an inspection line. The object and a bounding shape surrounding the object are displayed (504) to a user. If user input includes confirmation of the displayed bounding shape (506) then the adjusted bounding shape is the same bounding shape initially displayed to the user (in step 504) and the bounding shape may be applied to subsequently obtained images of same-type objects (508). If the user input does not include confirmation of the bounding shape (506) but rather includes changes to the bounding shape (510), then the changes to the bounding shape are applied to same-type objects in subsequently and/or previously obtained images (512). Thus, same-type objects in previously and/or subsequently obtained images may be now bound by a changed or adjusted bounding shape. Defects may then be detected (retroactively and/or going forward) within the changed or adjusted bounding shape (514).

In one embodiment input from a user may be used to facilitate defect detection. A user may provide input regarding defects and the system according to embodiments of the invention may use the user input to streamline the process of defect detection.

Figure 6:
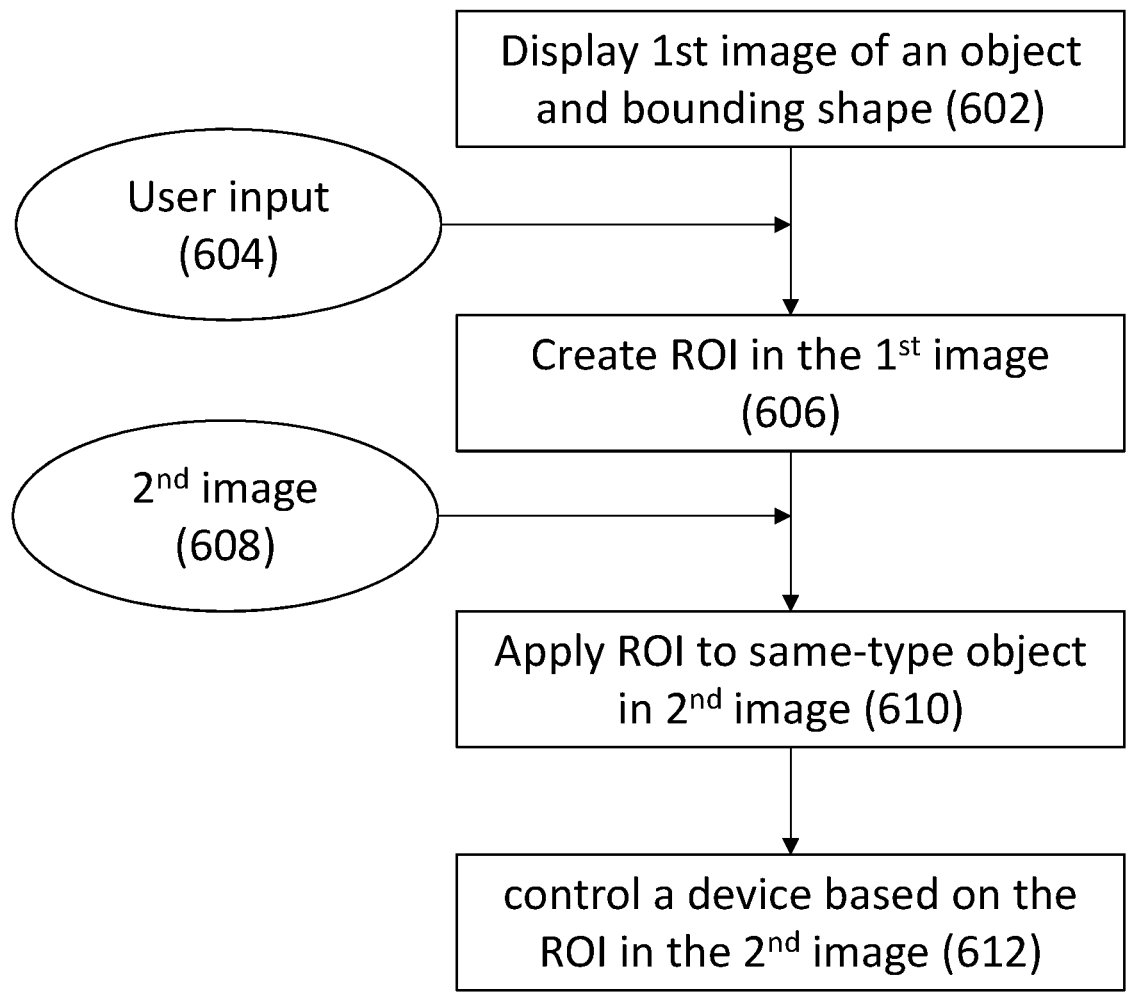
FIG. 6 is a schematic illustration of a method for automatic detection of defects using an ROI, according to embodiments of the invention.

In one example, which is schematically illustrated in FIG. 6, a method for automatic visual inspection, which may be carried out by processor 102, includes displaying a first image of an item on an inspection line, typically with a bounding shape surrounding the item (602). Processor 102 then receives user input, e.g., regarding defects in the item (604) and creates a mark of a region of interest (ROI) based on the user input (606).

For example, a user may input (e.g., via user interface device 106) an indication of a location of a defect within the object and a mark of an ROI may be created based on the location indicated by the user. For example, the user may indicate one or more points on an image of the item and processor 102 may create a line or other indication or mark (for example, as described with reference to creating a bounding shape) that includes the pixels or groups of pixels making up the points input by the user. In another example, the user may input an indication of an ROI. For example, the user may draw, on the image of the item, one or more shapes surrounding an area (or areas) of the item in which the user desires defect detection to occur, and the processor uses the input shape(s) to create the mark(s). The indication of ROI may include corrections or adjustments to a displayed mark. For example, a user may indicate that there are defects outside a displayed mark and/or that defects within a displayed mark are not considered to be defects. In some embodiments, pixels or areas in the image which are initially within an area defined by an indication of an ROI and/or which are initially determined by processor 102 to depict defects, may be indicated by a user as non-defected areas. Based on this or other user input, processor 102 may automatically amend or adjust the indication of ROI such that these pixels or areas are excluded from the region of interest, thus reducing incidents of false alarms.

Processor 102 may further detect a same-type item on the inspection line in a second image (608) and may create a bounding shape surrounding the same-type item, e.g., as described above. Processor 102 may apply the mark of the ROI to the same-type item in the second image (610). In one embodiment the mark of the ROI is applied to the same-type item in the second image such that it is aligned in relation to the bounding shape of the same-type object in direct correlation to the alignment of the mark of the ROI in the first image in relation to the bounding shape in the first image.

Processor 102 may then control another processor or device based the mark of the ROI applied to the second image (612). For example, processor 102 may cause the second image with the mark superimposed on the same-type item to be displayed (e.g., on user interface device 106). Alternatively or in addition, processor 102 may control a defect detection module (e.g., module 312) to detect defects within the ROI on the same-type item. Alternatively or in addition, processor 102 may control a camera (e.g., camera 103) to change imaging parameters (e.g., exposure time, focus and illumination) such that imaging of the ROI is optimized.

In some embodiments, as described above, the user input includes an indication that defects detected (e.g., by module 312) are not considered to be defects by the user. For example, differences in visible features of the item such as a pattern and/or color and/or texture, may be detected as defects by defect detecting module 312, however, these are not considered defects by the user. When these features are displayed to the user as defects the user may input a correction, indicating that the feature is not a defect. Thus, based on such user input, processor 102 may identify regions of false detections of defects and may automatically change the shape and/or location of the mark of the ROI or suggest a changed shape and/or location of the mark of the ROI for user approval, such that the changed mark does not include the region of false detection.

The first image may be obtained prior to the second image or subsequently to the second image. In the case where the first image is obtained subsequently to the second image, changes or adjustments made (manually or automatically) to the mark of the ROI in the first image may be applied retroactively to images obtained prior to the change. In this embodiment the changed mark may be displayed on images of the inspection line retroactively and defect detection may take place, retroactively, within the changed ROI in previously obtained images.

Automatic creation and display of adjusted borders of items and of regions of interest for detecting defects in the items and for other inspection tasks, greatly streamline and simplify visual inspection processes.

The invention claimed is:

1. A method for automatic visual inspection, the method comprising:
    displaying to a user, in a first image, an outline surrounding a first item on an inspection line;
    receiving input from the user via a user interface device;
    changing the outline surrounding the first item to create an adjusted outline, based on the input from the user;
    detecting a same-type item on the inspection line in a second image;
    causing the adjusted outline to be applied to the same-type item in the second image; and
    controlling, by a controller, at least one of a defect detecting module and a camera obtaining images of the first item and the same-type item;
    performing inspection tasks on the same-type item based on at least one of the controlled defect detecting module and the controlled camera obtaining images of the first item and the same-type item, the inspection tasks relating to an area within the adjusted outline in the second image.

2. The method of claim 1, wherein the same-type item is positioned on the inspection line at an angle relative to a position of the first item.

3. The method of claim 1, comprising:
    receiving input that the first item is defect-free;
    acquiring additional images of same-type objects items on the inspection line; and
    after a plurality of additional images are acquired, displaying to the user images of same-type items that differ from the first image, thereby minimizing an amount of time required from the user to review images.

4. The method of claim 3, wherein the same-type items in the images that differ from the first image have suspected defects, are in a wrong position or location, are not well detected or are not accurately surrounded by the first item's outline.

5. The method of claim 1, further comprising:
    controlling the camera, via the controller, such that imaging parameters relating to the area within the adjusted outline are optimized.

6. The method of claim 1, further comprising:
    displaying a previously or subsequently obtained image of the inspection line, with the adjusted outline surrounding a same-type item in the previously or subsequently obtained image.

7. The method of claim 6, further comprising:
    displaying the second image to the user.

* * * * *